(12) United States Patent
Windmöller et al.

(10) Patent No.: US 12,180,718 B2
(45) Date of Patent: Dec. 31, 2024

(54) DIMENSIONALLY STABLE FLOOR COVERING AND METHOD FOR THE PRODUCTION THEREOF

(71) Applicant: Windmöller GmbH, Augustdorf (DE)

(72) Inventors: Ulrich Windmöller, Schloss Holte-Stukenbrock (DE); Georg Kruse, Bielefeld (DE); Stefan Rose, Warstein (DE)

(73) Assignee: Windmöller GmbH, Augustdorf (DE)

( * ) Notice: Subject to any disclaimer, the term of this patent is extended or adjusted under 35 U.S.C. 154(b) by 0 days.

(21) Appl. No.: 17/766,791

(22) PCT Filed: Aug. 28, 2020

(86) PCT No.: PCT/EP2020/074139
§ 371 (c)(1),
(2) Date: Apr. 6, 2022

(87) PCT Pub. No.: WO2021/078428
PCT Pub. Date: Apr. 29, 2021

(65) Prior Publication Data
US 2024/0068243 A1 Feb. 29, 2024

(30) Foreign Application Priority Data
Oct. 25, 2019 (DE) .................... 10 2019 128 881.9

(51) Int. Cl.
| | |
|---|---|
| *E04F 15/10* | (2006.01) |
| *B32B 3/26* | (2006.01) |
| *B32B 5/02* | (2006.01) |
| *B32B 7/14* | (2006.01) |
| *B32B 27/12* | (2006.01) |
| *B32B 27/36* | (2006.01) |
| *E04F 15/02* | (2006.01) |

(52) U.S. Cl.
CPC .............. *E04F 15/107* (2013.01); *B32B 3/26* (2013.01); *B32B 5/028* (2013.01); *B32B 7/14* (2013.01);
(Continued)

(58) Field of Classification Search
CPC ........... B32B 27/40; B32B 3/26; B32B 5/028; B32B 7/14; B32B 27/12; B32B 27/36;
(Continued)

(56) References Cited

U.S. PATENT DOCUMENTS

| | | |
|---|---|---|
| 3,791,912 A | 2/1974 | Allard |
| 4,188,428 A | 2/1980 | Wolf |

(Continued)

FOREIGN PATENT DOCUMENTS

| | | |
|---|---|---|
| CN | 102794795 A | 11/2012 |
| DE | 102009044833 A1 | 6/2011 |

(Continued)

*Primary Examiner* — Kyle J. Walraed-Sullivan
(74) *Attorney, Agent, or Firm* — Richard M. Goldberg

(57) ABSTRACT

A floor covering includes a plastics core, which has an upper side and a lower side, a functional layer and a reinforcement mat arranged on the upper side, and which has fibers and voids located therebetween, wherein the reinforcement mat is located between the upper side of the plastics core and the functional layer, the reinforcement mat and the functional layer constituting a preproduced unit, in which the reinforcement mat is fastened to the functional layer, wherein the plastics core is joined with the preproduced unit in such a way that the plastics core is joined with the fibers of the reinforcement mat and through the voids of the reinforcement mat with the functional layer such that the floor covering has a high degree of dimensional stability, and a method for producing the floor covering.

13 Claims, 1 Drawing Sheet

(52) U.S. Cl.
CPC .............. *B32B 27/12* (2013.01); *B32B 27/36* (2013.01); *B32B 2262/101* (2013.01); *B32B 2471/00* (2013.01); *E04F 15/02155* (2013.01)

(58) Field of Classification Search
CPC ........... B32B 2262/101; B32B 2471/00; E04F 11/1043; E04F 11/1045; E04F 15/10; E04F 15/102; E04F 15/105; E04F 15/107; E04F 15/186
See application file for complete search history.

(56) References Cited

U.S. PATENT DOCUMENTS

| | | | | |
|---|---|---|---|---|
| 2008/0090477 | A1* | 4/2008 | Balthes | D01H 1/425 427/299 |
| 2014/0255659 | A1* | 9/2014 | Windmoller | B32B 27/12 428/221 |
| 2016/0114495 | A1* | 4/2016 | Pervan | B32B 37/1027 427/201 |
| 2016/0251800 | A1* | 9/2016 | Rose | D06N 3/183 442/64 |
| 2016/0279914 | A1* | 9/2016 | Rose | B32B 38/0004 |
| 2017/0050408 | A1* | 2/2017 | Park | B32B 3/26 |
| 2017/0144354 | A1* | 5/2017 | Lombaert | B32B 27/12 |

FOREIGN PATENT DOCUMENTS

| | | |
|---|---|---|
| DE | 102013114770 A1 | 6/2015 |
| DE | 102017100735 A1 | 7/2018 |
| EP | 3168388 A1 | 5/2017 |
| WO | 2015/051852 A1 | 4/2015 |
| WO | 2015/165886 A1 | 11/2015 |
| WO | 2016/134243 A2 | 8/2016 |

* cited by examiner

DIMENSIONALLY STABLE FLOOR COVERING AND METHOD FOR THE PRODUCTION THEREOF

BACKGROUND OF THE INVENTION

The invention relates to a floor covering comprising a plastics core, that has an upper side and a lower side, wherein a functional layer and a reinforcement mat are arranged on the upper side, which reinforcement mat has fibers and voids located between the fibers. Furthermore, the invention relates to a method for the production of such floor coverings.

A floor covering in the form of an underlay mat, in which a self-adhesive film is disposed on the upper side of the plastics core is known from EP 3 168 388 A1, which self-adhesive film comprises a carrier film made of plastic, an adhesive layer applied to the carrier film and a fiber scrim that is embedded in the adhesive layer. The self-adhesive layer is used to join the underlay mat with, for example, flooring panels, which are laid on the underlay mat. The scrim embedded in the adhesive layer serves to stabilize the adhesive layer and thereby the underlay mat.

A method for production of a multilayer floor covering is known from DE 10 2017 100 735 A1, in which floor covering a glass nonwoven fabric is laid on a decal sheet. Liquid polyurethane is then applied on the decal sheet and the glass nonwoven fabric, which liquid polyurethane then penetrates through the glass nonwoven fabric to the decal sheet. A strong connection is created between the decal sheet, the glass nonwoven fabric and the polyurethane core resulting from the application of the urethane. The result is a floor covering, that exhibits good dimensional stability even with larger temperature fluctuations. This makes it possible to avoid undesired gaps, which could occur between laid elements or strips of this floor covering when there are fluctuations in temperature.

SUMMARY OF THE INVENTION

At the same time, there is the need to provide further floor coverings that have good dimensional stability with the simplest possible construction and which may be produced inexpensively. The invention is therefore based upon the task of providing a floor covering that may be used without problems with fluctuating environmental conditions and which has a simple construction and is easy to produce.

The task underlying the invention is solved with the combination of features according to the claims. Embodiment examples of the invention may be taken from the dependent claims.

It is provided according to the invention that the reinforcement mat and the functional layer are on hand as a preproduced unit, in which the reinforcement mat is fastened to the functional layer, wherein the plastics core is joined to the preproduced unit in such a way that the plastics core is connected to the fibers of the reinforcement mat and additionally to the functional mat through the voids within the reinforcement mat. This results in a particularly stable connection between the functional layer, the reinforcement mat and the plastics core, whereby the floor covering is particularly dimensionally stable. The connection between the plastics core and the functional layer therefore takes place in two independent ways. On the one hand, there is an indirect pathway, since the plastics core is attached to the reinforcement mat, which in turn is fastened to the functional layer. On the other hand, there is an immediate connection between the plastics core and the functional layer via the voids of the reinforcement mat.

The preproduced unit may be produced as a roll-up endless product. Following its manufacture, the preproduced unit may initially be stored and/or transported to another production facility, where it may then be joined to the plastics core at a later time. It is also possible that the production of the preproduced unit and its joining with the plastics core is carried out with successive method steps. In this, the reinforcement mat is initially fastened to the functional layer and then immediately after successful fastening, the joining with the plastics core takes place on the same line.

In one embodiment example, the functional layer comprises a plastics film. The plastics film can, for example, be made of polyethylene or polypropylene. Polyethylene or polypropylene are further examples for the material which the plastics film may be made of. A decorative pattern may be applied to the plastics film. It is also conceivable that the functional layer comprises a decorative paper, upon which a decorative pattern is printed.

The functional layer and, in particular, the plastics film may have a thickness of 8 to 220 μm, preferably 20 to 50 μm. A PET-film, having a thickness of between 35 and 40 μm is used in a concrete embodiment example.

The reinforcement mat may be a glass fiber mat. In this case, the fibers of the reinforcement mat are glass fibers. The reinforcement mat may alternatively or additionally have fibers made of polyester, polyamide or nylon. It is also conceivable to use natural fibers. The fibers may have a virtually unlimited length such as continuous fibers. They may also be formed of fiber pieces of only limited length (for example, having a length shorter than 3 cm).

The reinforcement mat may comprise a nonwoven fabric, a woven fabric, a knitted fabric or a scrim. When speaking of a woven fabric, it is understood to be a textile fabric made out of intersecting warp and weft threads that are woven together. In the case of a scrim, one or more thread systems having various orientation directions lie one on top of another, wherein the crossing points are preferably fixed. Nonwoven fabrics are fabrics that have not been woven, the production of which occurs with statistically disordered fibers. A knitted fabric is a textile fabric, which is created from one or more thread systems by means of stitch formation.

The reinforcement mat may have a binding agent for fixing the fibers, wherein the binding agent is preferably also used for fastening of the reinforcement mat to the functional layer. The fibers may be impregnated with or coated by the binding agent, which is preferably a polymeric binding agent, wherein, in particular in the case of a scrim, the crossing points are fixed with this binding agent. The polymeric binding agent may be a thermosetting or thermoplastic material.

The plastics core is preferably made of polyurethane. The plastics core made out of polyurethane makes it possible to provide a floor covering that has favorable properties as regards impact noise insulation, walking comfort, elasticity and flexibility. Moreover, polyurethane may also be manufactured using renewable raw materials such castor oil that is free of any harmful additives such as, for example, plasticizers, formaldehyde, heavy metals or the like. Other materials such as PVC, polyethylene or polypropylene may also be used for the plastics core.

The plastics core may be filled with fillers, preferably with mineral fillers such as sand or chalk. This allows for the density of the plastics core and the mechanical and acoustic properties of the plastics core to be adjusted. The density of the plastics core may thereby take on values that are significantly higher that the densities of the plastics used. In one embodiment example, the density of the plastics core is greater than 1.5 or even 1.8 g/cm$^3$. The density of the plastics core may also take on a value of less than 1.5 g/cm$^3$, for example, between 0.9 and 1.5 g/cm$^3$. In one embodiment example, there is a plastics core with foamed plastics and with fillers.

The thickness of the plastics core may be 0.5 to 10 mm, preferably 0.9 to 4 mm. The total thickness of the floor covering may be 1 to 12 mm, preferably 1.5 to 5 mm.

At least one additional layer can be provided on the side of the functional layer that faces away from the plastics core or on the upper side. This additional layer can, for example, be an adhesive layer, that may be covered by a peel-off protective film. In this manner, the floor covering according to the invention can be used as a self-adhesive underlay mat, upon which it is then possible to lay a further floor covering.

Alternatively, this additional layer can also be a transparent wear layer that protects the functional layer from external influences from above. For example, in this embodiment example, the functional layer may be a decorative paper with a decorative pattern that is visible from above through the transparent wear layer.

A rear-sided functional layer can be arranged on the lower side of the plastics core. This rear-sided functional layer may have the role of backing layer that prevents deformation of the floor covering out of its main plane (cupping). Alternatively or additionally, the rear-sided functional layer may play the role of a damping layer. It is also conceivable that the rear-sided functional layer is a self-adhesive film to bond the floor covering according to the invention on a underlying subfloor or screed. The rear-sided functional layer may thus itself be a multilayer construction. In the embodiment example of the self-adhesive film, the functional layer may comprise a carrier film, an adhesive layer that is applied onto the carrier film and a peel-off protective film.

The floor covering according to the invention may be implemented as a roll-up and/or foldable sheet material. The floor covering according to the invention may also be implemented in the form of a floor panel, which preferably has connecting profiles on at least two edges for joining with the adjacent floor panels of the same design. The connection profiles can have a tongue and groove. They can also have interlocking systems, such that connection profiles that are joined interlock with one another in the horizontal and vertical direction. Preferably, the connection profiles are fully formed into the plastics core, for example, by means of milling. On the two edges, a stepped overhang, or alternatively, a step-like support that is in addition thereto, is/are provided so that two adjacent floor panels overlap step by step when a flat floor surface is formed.

A further task of the invention, which is to provide a method for producing a floor covering with good dimensional stability is solved according to the method claims. Embodiment examples relating to this may be taken from the dependent method claims.

The method according to the invention comprises the provision of the preproduced unit, wherein the reinforcement mat is fastened to the functional layer. This step of the method is followed by the joining of the preproduced unit to the plastics core, wherein the preproduced unit is oriented to the upper side of the plastics core in such a way that the reinforcement mat is arranged between the upper side of the plastics core and the functional layer. The plastics core is then joined with the preproduced unit, wherein the plastics core is both connected to the reinforcement mat as well as also directly to the functional layer. The direct joining of the plastics core with the functional layer is made possible by means of the voids in the reinforcement mat, wherein the means of connection for joining the plastics core and the functional layer reach through the voids in the reinforcing mat.

The previously described binding agent may be used to fix the fibers of the reinforcement mat, which may also be used to fasten the reinforcement mat to the functional layer.

The reinforcement mat may be joined to the functional layer with the assistance of pressure and/or heat input (for example, using calendering). In one embodiment example, in which the reinforcement mat comprises a scrim, the fibers and crossing points of which are fixed with a thermoplastic binding agent, it is possible that the reinforcement mat and the functional layer can be joined together by the calendering. During calendering, the temperature should be adjusted so that the thermoplastic binding agent softens. It can then work as an adhesive between the fibers of the reinforcement mat and the functional layer. Thereinafter, the thermoplastic binding agent once again becomes hard, so that the preproduced unit can now only be joined with the plastics core.

The reinforcing mat can be placed on the functional layer in order to produce the preproduced unit when the binding agent is in a liquid or pasty state. The fibers of the scrim can, for example, be wetted with a not yet fully cured thermosetting binding agent such as polyurethane. The scrim wetted in this way is then laid on the functional layer. The still liquid binding agent on the one side fixes the fibers of the scrim upon curing to one another while ensuring, at the same time, that there is a solid joining of the fibers to the functional layer. After successful curing of the binding agent, the connection to the plastics core takes place downstream. The production of the scrim with the fixing of the binding agent is thus combined with the step of fastening the scrim to the functional layer. The joining of the reinforcement mat with the functional layer and the joining of the plastics core with the composite element consisting of the functional layer and the reinforcement mat are separated according to the invention.

A plastics material can be used to produce the plastics core, a plastics material that can be applied in a liquid state on the prefabricated unit of the functional layer and reinforcement mat. The liquid plastics material thereby passes through the voids of the reinforcement mat and thereby forms a connection with the functional layer and the fibers of the reinforcement mat. In a preferred embodiment example, the plastics material in liquid state is liquid polyurethane or a liquid mixture made up of the components (polyol and isocyanates) from which polyurethane is formed.

It has been found to be particularly advantageous that through the method according to the invention and the good adhesion that can be achieved thereby between the functional layer, the reinforcement mat and the material of the plastics core, it is possible to dispense with the use of additional adhesive, which is generally applied immediately before the application of the liquid polyurethane on the functional layer and thereupon arranged reinforcement mat. This not only reduces the costs of the materials, but also avoids the problems related to the application of the adhesive such as blistering in the polyurethane material. The invention therefore leads to a floor covering with particularly homogeneous plastics core without undesired irregularities.

BRIEF DESCRIPTION OF THE DRAWINGS

The invention will be explained in more detail in reference to the embodiment example shown in the drawing. Wherein.

DETAILED DESCRIPTION

Figure 1:
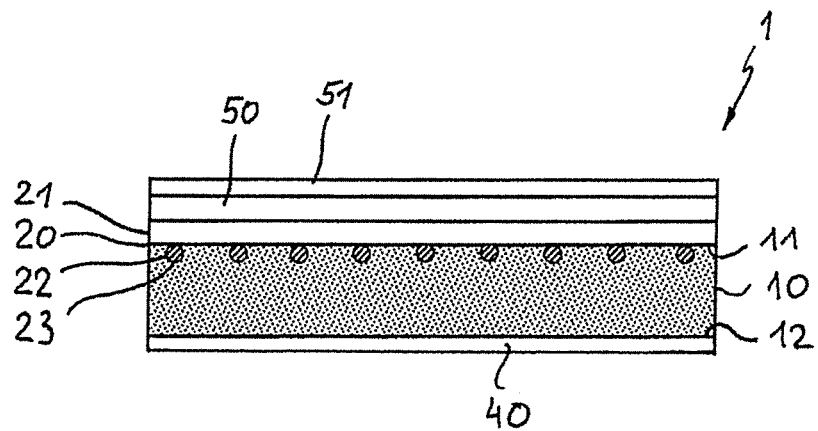
FIG. 1 schematically shows a multilayer floor covering according to the invention.

FIG. 1 schematically shows a floor covering, that is referred to in its entirety as 1. The floor covering comprises one plastics core 10 made of polyurethane, wherein the plastics core may be filled with a mineral filler. A prefabricated or preproduced unit 20 is arranged in an upper side 11 of the plastics core 10, which comprises one functional layer 21, here in the form of a PET-film and a reinforcement mat 22. In the illustration of FIG. 1, only a few of the fibers 23 of the reinforcement mat 22 are visible. The preproduced unit 20 will be discussed in more detail later.

A rear-sided functional layer 40 is arranged on a lower side 12 of the plastics core 10. In this embodiment example, this functional layer 40 is a nonwoven fabric, that is suitable to level out any irregularities of a subfloor upon which the floor covering 1 may be laid or installed.

On a side of the PET-film 21 that faces away from the plastics core 10, further layers are provided. These should here be an adhesive layer 50 and a peel-off protective film 51 that is disposed there above. The floor covering 1 illustrated in FIG. 1, can be used as an underlay mat, which can be joined to flooring panels, which are laid on the underlay mat, following the removal of the protective film 51.

Figure 2:
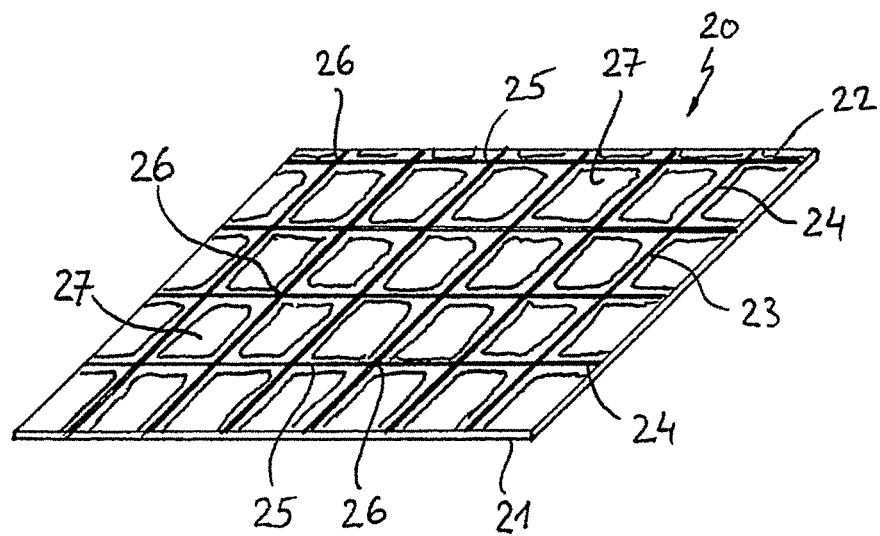
FIG. 2 shows a preproduced unit as part of the floor covering of FIG. 1.

FIG. 2 schematically shows the prefabricated unit 20 from a perspective view. In the illustration of FIG. 2, the fibers 23 are now located above the PET-film 21. The fibers 23 comprise longitudinal fibers 24 and transverse fibers 25 that are oriented perpendicular to them. The arrangement of the longitudinal fibers 24 and the transverse fibers 25 represent a scrim, in which the individual fibers are simply laid upon one another. The crossing points that result from the orientation of the fiber 24, 25 are designated with 26.

A binding agent is used to fix the fibers 24, 25 under one another or for fixing the crossing points 26, with which the individual fibers 24, 25 can be wetted. If a scrim—this also applies in an analogous manner to other embodiments of the reinforcing mat 22—is laid on the PET film 21 with the fibers 24, 25 wetted with the binding agent, wherein the binder has not yet dried or cured, then the binding agent also wets or covers the areas of PET film 21 with which the wetted fibers 24, 25 come into contact. The binding agent is thereby not only used to fix the fibers 24, 25 one to another, but rather it also leads to a fastening of the individual fibers 24, 25 to the PET-film 21. The binding agent thereby also functions as an adhesive, with which the reinforcement mat 22 is fastened to the PET-film 21.

The adhesion of the reinforcement mat 22 or more correctly said, the adhesion of the individual fibers 24, 25 of the reinforcement mat 22 to the PET-film 21 may be strengthened through pressure. By way of example, the PET-film 21 and the reinforcement mat 22 may be fed to a calendering nip in which the fibers 24, 25 are compressed against the PET-film 21.

FIG. 2 further shows the remaining voids 27 of the reinforcement mat 22. In the embodiment example of FIG. 2 they correspond to the surfaces on the PET-film, they correspond to the areas that have not been wetted/covered by the binding agent after the drying or curing of the binding agents, possibly supported or accompanied by the application of pressure and elevated temperature. The PET-film 21 is exclusively wetted or covered with the binding agent in the immediate vicinity of the individual fibers 24, 25 or in the immediate vicinity of the crossing points 26. It should be noted that the voids 27 are only illustrated in a schematic manner. If the fibers 24, 25 are only lightly wetted with the binding agent and laid out in this way on the PET-film 21, the voids 27 practically extend over the entire mesh width of the scrim. In this case, the PET-film 21 is approximately only covered with the binding agent on the contact line of the overlying fiber.

Liquid polyurethane can be applied from above to the prefabricated unit 20 with dry or cured binding agent, in the orientation shown in FIG. 2 to produce the floor covering 1, wherein this polyurethane has direct contact not only with the fibers 24, 25, but also direct contact to the PET-film 21 because of the voids 27. In this manner, a particular solid connection is possible between the plastics core 10 and the prefabricated unit 20, which comprises the PET-film 21 and the reinforcement mat 22. This results in a particularly dimensionally stable floor covering in the longitudinal and transverse directions.

A ratio of the portion of the area of the functional layer (PET-film 21), which is wetted or covered with the binding agent, can assume a value of between 2 and 80% in relation to the overall area of the functional layer. On the one hand, the ratio depends on the fiber density (number of fibers per unit of area) and their diameter as well as of the quantity and the viscosity of the binding agent used. The lower the ratio, the greater the surface adhesion of the core material directly to the functional layer 21. The greater the ratio, the greater the indirect adhesion of the core material to the functional layer 21 by means of the reinforcement mat 22, wherein an intense adhesion between the functional layer 21 and the reinforcement mat 22 occurs through the then larger adhesion surface between the binding agent and the functional layer 21.

In the case of a scrim, in which the distance to the neighboring fibers may be great, the ratio assumes comparatively small values, for example 2 to 6%. In the case of a nonwoven fabric, many fibers can lie on the PET-film 21 on each unit of area, so that the ratio can assume rather large values. Here the ratio can assume a value greater than 40%.

REFERENCE LIST

1 Floor covering/underlay mat
10 Plastic core
11 Upper side
12 Lower side
20 Preproduced/prefabricated unit
21 Functional layer/PET-film
22 Reinforcement mat
23 Fiber
24 Longitudinal fiber
25 Cross fiber
26 Crossing point
27 Void
40 Rear functional layer
50 Adhesive layer
51 Protective film

What is claimed is:

1. A floor covering comprising:
a plastics core having an upper side and a lower side, and
a functional layer and reinforcement mat arranged on the upper side, the reinforcement mat having fibers and voids located therebetween,
wherein the reinforcement mat is located between the upper side of the plastics core and the functional layer,
wherein the functional layer comprises a plastics film,
wherein the reinforcement mat and the plastics film constitute a preproduced unit, in which the reinforcement mat is fastened to the plastics film,
wherein the plastics core is joined with the preproduced unit in such a way that the plastics core is joined with the fibers of the reinforcement mat and through the voids of the reinforcement mat with the plastics film,
wherein the reinforcement mat has a binding agent for fixing the fibers,
wherein the binding agent also fastens the reinforcement mat to the plastics film, and
wherein a ratio of a first portion of the area of the functional layer, which is wetted or covered with the binding agent, assumes a value of between 2 and 80% in relation to the overall area of the functional layer such that the voids are defined in a second portion of the functional layer other than the first portion, in relation to the overall area of the functional layer, that is not wetted or covered with the binding agent, and
wherein the fibers of the reinforcement mat are only positioned in the first portion of the area of the plastics film that is wetted or covered with the binding agent.

2. A floor covering according to claim 1, wherein the plastics film is made of polyester.

3. A floor covering according to claim 2, wherein the plastics film is made of PET.

4. A floor covering according to claim 1, wherein the reinforcement mat is a glass fiber mat.

5. A floor covering according to claim 1, wherein the reinforcement mat comprises one of:
a nonwoven fabric,
a woven fabric,
a knitted fabric or
a scrim.

6. A floor covering according to claim 1, wherein the plastics core is made of polyurethane.

7. A floor covering according to claim 1, further comprising at least one further layer provided on a side of the functional layer facing away from the plastics core.

8. A floor covering according to claim 1, further comprising a rear-sided functional layer arranged on the lower side of the plastics core.

9. A method for producing a floor covering, wherein the floor covering has a plastics core with an upper side and a lower side and a functional layer and a reinforcement mat arranged on the upper side, the reinforcement mat having fibers and voids disposed therebetween, wherein the method comprises the following steps:
providing that the functional layer comprises a plastics film,
providing a preproduced unit comprising the plastics film and the reinforcement mat, wherein the reinforcement mat is fastened onto the plastics film;
bonding the preproduced unit to the plastics core such that the reinforcement mat is arranged between the upper side of the plastics core and the plastics film, and such that the plastics core is joined with the reinforcement mat and through the voids of the reinforcement mat to the plastics film;
using a binding agent for:
fixing the fibers of the reinforcement mat and
fastening the reinforcement mat to the plastics film,
wherein a ratio of a first portion of the area of the functional layer which is wetted or covered with the binding agent, assumes a value of between 2 and 80% in relation to the overall area of the functional layer such that the voids are defined in a second portion of the functional layer other than the first portion, in relation to the overall area of the functional layer, that is not wetted or covered with the binding agent, and
positioning the fibers of the reinforcement mat only in the first portion of the area of the plastics film that is wetted or covered with the binding agent.

10. A method according to claim 9, further comprising the step of joining the reinforcement mat with the functional layer with the assistance of one of:
pressure,
heat input, or
both pressure and heat input.

11. A method according to claim 9, further comprising the step of placing the reinforcement mat against the functional layer, when the binding agent is in a liquid state.

12. A method according to claim 9, wherein the reinforcement mat comprises a network of transverse fibers and longitudinal fibers, which are fixed at crossing points thereof.

13. A method according to claim 9, wherein a plastics material is used for production of the plastics core, and further comprising the step of applying plastics material in a liquid state to the preproduced unit of the functional layer and reinforcement mat, such that the liquid plastics material passes through the voids of the reinforcement mat and thereby forms a connection with the functional layer and the fibers of the reinforcement layer.

* * * * *